United States Patent
Nishiyama et al.

(10) Patent No.: US 8,626,432 B2
(45) Date of Patent: Jan. 7, 2014

(54) VEHICLE SAFE DRIVING PROMOTION SYSTEM

(75) Inventors: Yoshitaka Nishiyama, Okegawa (JP); Osamu Uekusa, Saitama (JP); Yuji Matsuki, Fukuoka (JP)

(73) Assignees: UD Trucks Corporation, Saitama (JP); Fukuoka Institute of Technology, Fukuoka (JP)

( * ) Notice: Subject to any disclaimer, the term of this patent is extended or adjusted under 35 U.S.C. 154(b) by 0 days.

(21) Appl. No.: 13/634,053

(22) PCT Filed: Mar. 9, 2011

(86) PCT No.: PCT/JP2011/055530
§ 371 (c)(1),
(2), (4) Date: Sep. 11, 2012

(87) PCT Pub. No.: WO2011/111750
PCT Pub. Date: Sep. 15, 2011

(65) Prior Publication Data
US 2013/0006513 A1 Jan. 3, 2013

(30) Foreign Application Priority Data

Mar. 12, 2010 (JP) ................................. 2010-055508

(51) Int. Cl.
*G06F 17/10* (2006.01)
*B60Q 1/00* (2006.01)

(52) U.S. Cl.
USPC .......................................... 701/301; 340/436

(58) Field of Classification Search
USPC .......... 701/400–541, 300–301; 340/988–996, 340/436
See application file for complete search history.

(56) References Cited

U.S. PATENT DOCUMENTS

| 5,465,079 A | 11/1995 | Bouchard et al. |
| 7,769,498 B2 | 8/2010 | Isaji et al. |
| 2004/0024502 A1* | 2/2004 | Squires et al. ................... 701/33 |
| 2008/0004807 A1* | 1/2008 | Kimura et al. ................ 701/301 |
| 2011/0087433 A1* | 4/2011 | Yester ........................... 701/301 |

FOREIGN PATENT DOCUMENTS

| JP | 06-075048 A1 | 3/1994 |
| JP | 06-162396 A1 | 6/1994 |
| JP | H09501784 A1 | 2/1997 |
| JP | 2000-113367 A1 | 4/2000 |
| JP | 2000-215394 A1 | 8/2000 |

(Continued)

OTHER PUBLICATIONS

ISR for PCT/JP2011/055530 dated Apr. 5, 2011.

*Primary Examiner* — Muhammad Shafi
(74) *Attorney, Agent, or Firm* — Lowe Hauptman & Ham LLP

(57) ABSTRACT

A distance sensor detects a target distance from a vehicle to a target in front of the vehicle, and a vehicle speed sensor detects a vehicle speed. A controller calculates a stopping distance of the vehicle from the vehicle speed. The controller calculates a collision possibility index from the target distance and the stopping distance, and calculates a kinetic energy of the vehicle immediately before a collision with the target from the vehicle speed and the target distance. The controller warns a driver of the vehicle of the possibility of a collision and the scale of damage to be caused by the collision on the basis of the collision possibility index and the kinetic energy of the vehicle immediately before the collision. As a result, the driver is provided with information promoting safe driving which appeals to the driver forcefully.

8 Claims, 8 Drawing Sheets

(56) References Cited

FOREIGN PATENT DOCUMENTS

| | | | |
|---|---|---|---|
| JP | 2003-291758 A1 | | 10/2003 |
| JP | 2007-024599 A1 | | 2/2007 |
| JP | 2007-076632 A1 | | 3/2007 |
| JP | 2007-083922 | * | 4/2007 |
| JP | 2008-001285 A1 | | 1/2008 |

* cited by examiner

VEHICLE SAFE DRIVING PROMOTION SYSTEM

RELATED APPLICATIONS

The present application is based on International Application Number PCT/JP2011/055530 filed Mar. 9, 2011, and claims priority from Japanese Application Number 2010-55508 filed Mar. 12, 2010.

FIELD OF THE INVENTION

This invention relates to a safe driving promotion system for a vehicle.

BACKGROUND OF THE INVENTION

The following references, published by the Japan Patent Office for the purpose of promoting safe driving of a road surface traveling vehicle, propose systems for issuing a warning after detecting an inter-vehicle distance between a host vehicle and a vehicle traveling in front of the host vehicle and systems for promoting self-restraint with regard to dangerous driving by creating evaluation data recording the driving behavior of a host vehicle and informing a driver thereof.
  JP2007-076632A, Mar. 29, 2007
  JP06-162396A, Jun. 10, 1994
  JP06-075048A, Mar. 18, 1994
  JP09-501784A, Feb. 18, 1997

SUMMARY OF THE INVENTION

In these prior art references, warnings are issued during vehicle travel and the driver is provided with information such as a driving skill assessment and points of caution. However, the driver may ignore or not make sufficient use of these warnings and information depending on the circumstances of the driver, the need for special driving operations corresponding to these circumstances, and a degree of urgency, It is therefore an object of this invention to provide a safe driving promotion system that appeals to a driver more forcefully.

In order to achieve this object, a safe driving promotion system according to this invention comprises a distance sensor that detects a target distance from a vehicle to a target in front of the vehicle, a vehicle speed sensor that detects a vehicle speed, and a programmed programmable controller.

The controller is programmed to calculate a stopping distance of the vehicle from the vehicle speed, calculate a collision possibility index corresponding to a ratio between the target distance and the stopping distance, calculate a kinetic energy of the vehicle immediately before a collision with the target from the vehicle speed and the target distance, and provide a driver with information indicating a danger of a collision based on the collision possibility index and collision damage based on the kinetic energy of the vehicle immediately before the collision.

The details as well as other features and advantages of this invention are set forth in the remainder of the specification and are shown in the accompanying drawings.

DESCRIPTION OF THE PREFERRED EMBODIMENTS

Figure 1:
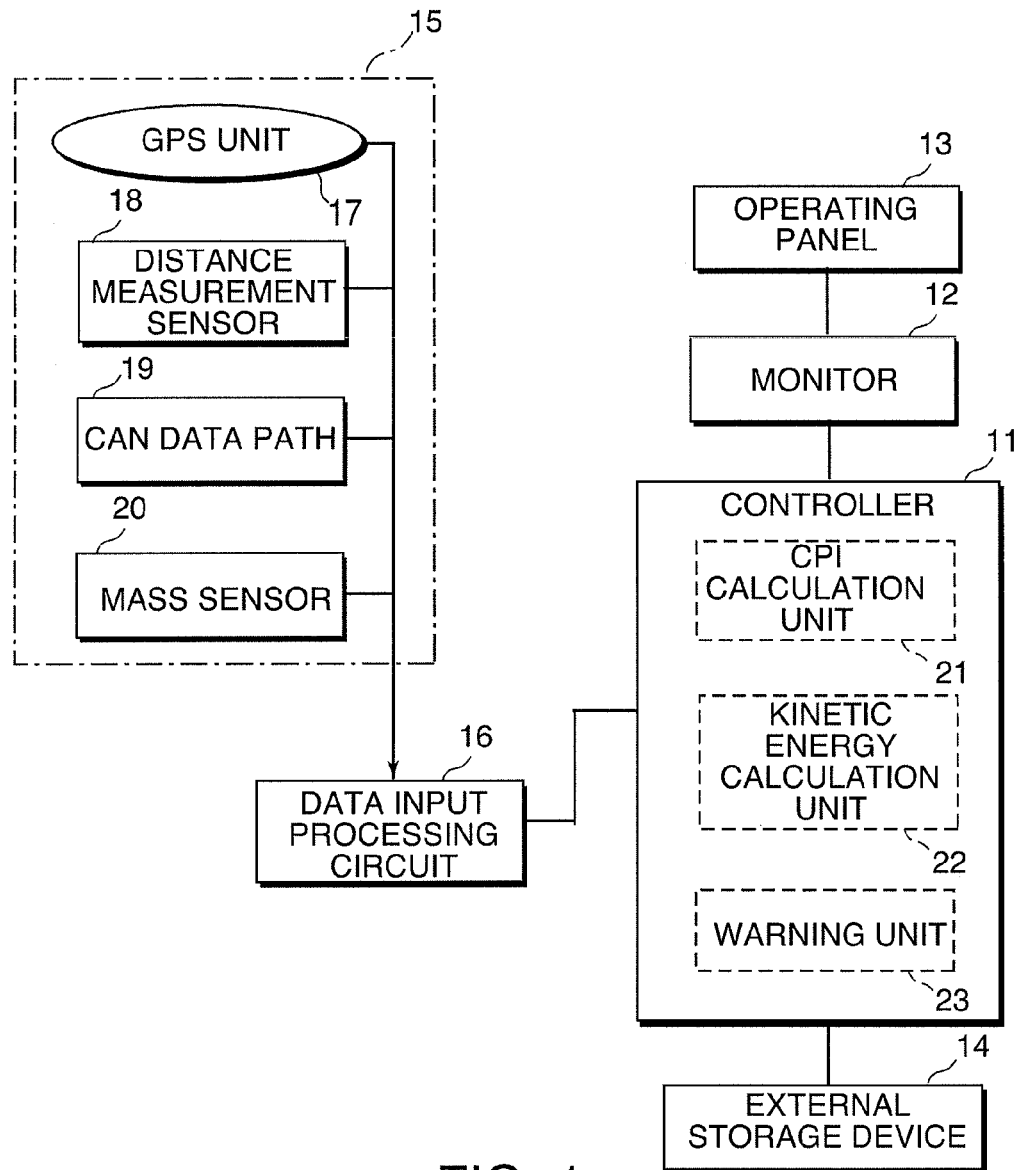
FIG. 1 is a block diagram showing a safe driving promotion system according to this invention.

Referring to FIG. 1 of the drawings, a vehicle safe driving promotion system according to this invention comprises a controller 11, a monitor 12, an operating panel 13, an external storage device 14 constituted by a non-volatile memory or a hard disk, and a sensor group 15 for detecting driving and travel conditions of a vehicle. These components are installed in all vehicles under the vehicle safe driving promotion system as vehicle installed facilities.

The sensor group 15 comprises a GPS unit 17 constituted by a receiver of a Global Positioning System (GPS) for obtaining a current position of the vehicle, a distance measurement sensor 18 that measures a target distance to a target existing in front of the vehicle in a vehicle advancement direction, a CAN data path 19 that obtains vehicle driving conditions such as a vehicle speed, an accelerator pedal opening, and an engine torque, and a mass sensor 20. The CAN data path 19 is connected to a vehicle speed sensor, an accelerator pedal opening sensor, a torque sensor, and so on via a control area network (CAN).

The mass sensor 20 calculates a vehicle mass by, for example, determining a sprung mass from an amount of deformation of a suspension spring of the vehicle and adding an unsprung mass, which is a fixed value, to the sprung mass. Alternatively, a vehicle driving force F is calculated from an engine rotation speed and the engine torque as the vehicle accelerates on a flat road, a vehicle acceleration $\alpha$ is determined from a detected value of the vehicle speed, and a vehicle mass m is calculated from an operational equation $F=\alpha m$.

The sensor group 15 is connected to a controller 11 via a data input processing circuit 16. The data input processing circuit 16 converts data input from the sensor group 15 into signals that can be received by the controller 11, and then inputs the signals into the controller 11.

The controller 11 is constituted by a microcomputer including a central processing unit (CPU), a read-only memory (ROM), a random access memory (RAM), and an input/output interface (I/O interface). The controller 11 may be constituted by a plurality of microcomputers.

The controller 11 comprises a CPI calculation unit 21 that calculates a collision possibility index (CPI) as an index indicating a possibility of colliding with the target, a kinetic energy calculation unit 22 that calculates a kinetic energy value KE of the vehicle immediately before a collision as an index indicating a degree of damage to be caused by a collision with the target, and a warning unit 23 that issues a warning indicating the possibility of a collision and the degree of damage to be caused by the collision on the basis of the collision possibility index CPI and the kinetic energy value KE of the vehicle immediately before the collision. The respective units 21 to 23 are virtual units representing functions of the controller 11, and do not necessarily exist as physical entities.

The CPI calculation unit 21 calculates a ratio CPI between a target distance Dhw from the vehicle to the target and a stopping distance Dst of the vehicle using a following Equation (1).

$$CPI = \frac{Dst}{Dhw} \quad (1)$$

The stopping distance Dst of the vehicle is provided by a following Equation (2).

$$Dst = Vf \cdot Tr + \frac{Vf^2}{2 \cdot \mu \cdot g} \quad (2)$$

where,
Vf=vehicle speed,
Tr=driver reaction time,
μ=frictional coefficient between tires and road surface, and
g=gravitational acceleration.

The stopping distance Dst indicates a stopping distance of the vehicle in a so-called ideal braking condition where, for example, at an occurrence point of an event in which the target stops there and then, the driver notices the event and decelerates the vehicle rapidly by pressing a brake pedal.

When CPI exceeds 1.0, Dst>Dhw, and in this case, a collision will occur even if the driver rapidly decelerates the vehicle.

A detection value obtained from the data path 19 is used as the vehicle speed Vf. Fixed values stored in the ROM are used as the reaction time Tr, the frictional coefficient μ, and the gravitational acceleration g. Actual measurement values may also be used favorably as the reaction time Tr of the driver and the frictional coefficient μ.

Further, in a condition where the collision possibility index CPI equals or exceeds 1.0, the CPI calculation unit 21 calculates a duration CPIt of this condition. A degree of driving tiredness and a decrease in a driving concentration of the driver are then estimated on the basis of CPI and CPIt, and when these elements equal or exceed a predetermined level, a warning encouraging the driver to stop the vehicle and rest is displayed on the monitor 12 and output by voice.

The kinetic energy calculation unit 22 calculates a vehicle speed Vc immediately before the collision from a following Equation (3) using the inter-vehicle distance Dhw between the vehicle and the target, the reaction time Tr of the driver of the vehicle, the vehicle speed Vf, and the frictional coefficient μ between the tires of the vehicle and the road surface.

$$Vc = \sqrt{-2 \cdot \mu \cdot g(Dhw - Vf \cdot Tr) + Vf^2} \quad (3)$$

The kinetic energy calculation unit 22 also calculates the kinetic energy KE of the vehicle immediately before the collision from a following Equation (4) using the vehicle mass m and the vehicle speed Vc immediately before the collision, calculated in Equation (3).

$$KE = m \cdot \frac{Vc^2}{2} \quad (4)$$

It should be noted that the kinetic energy value KE is considered as zero in a case where CPI is smaller than 1.0.

When the collision possibility index CPI reaches or exceeds a predetermined level, the warning unit 23 issues a warning to the driver on the basis of the kinetic energy value KE by displaying the degree of damage to be caused by the collision by character display on the monitor 12 and voice output.

Calculated values of the collision possibility index CPI and the kinetic energy value KE and a measured value of the duration CPIt are stored as needed in the external storage device 14 installed in the vehicle together with detection values relating to the driving and travel conditions.

Further, the safe driving promotion system displays a risk evaluation map on the monitor 12 in response to a check request input by the driver into the operating panel 13 in relation to a pattern following completion of a vehicle driving operation.

Driving and travel data relating to vehicle driving behavior patterns, and determination reference values relating respectively to the collision possibility index CPI, the kinetic energy value KE of the vehicle, and the duration CPIt, which are used to determine whether or not driving behavior likely to cause a collision is underway, are stored in advance in the external storage device 14 installed in the vehicle.

Figure 2:
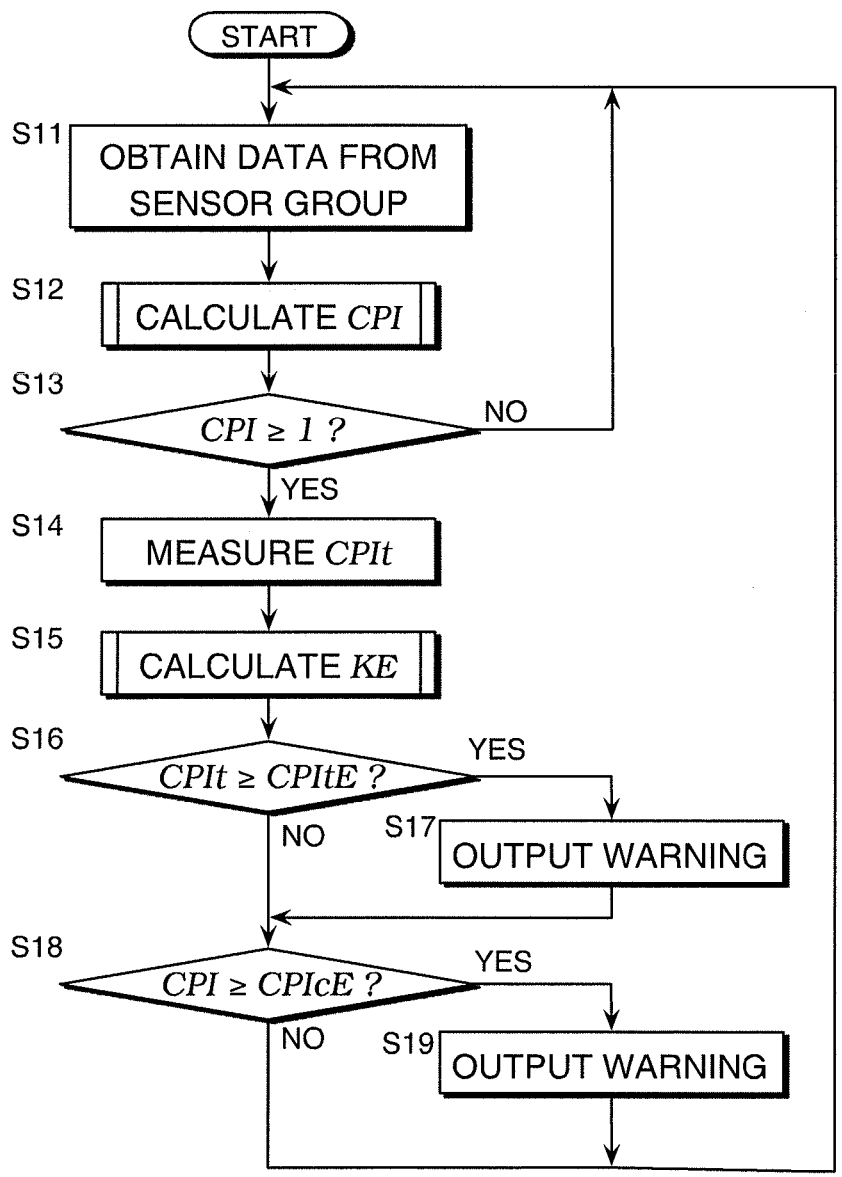
FIG. 2 is a flowchart illustrating a safe driving promotion routine executed by a controller according to this invention.

Referring to FIG. 2, a safe driving promotion routine executed by the controller 11 to realize the above functions will be described. This routine is executed repeatedly in a condition where an ignition switch of the vehicle is ON, and stopped when the ignition switch is turned OFF.

In a step S11, the controller 11 obtains data detected by the sensor group 15 such as a vehicle position, the inter-vehicle distance Dhw to the target, the vehicle speed Vf, the accelerator pedal opening, the engine torque, and the vehicle mass.

Figure 3:
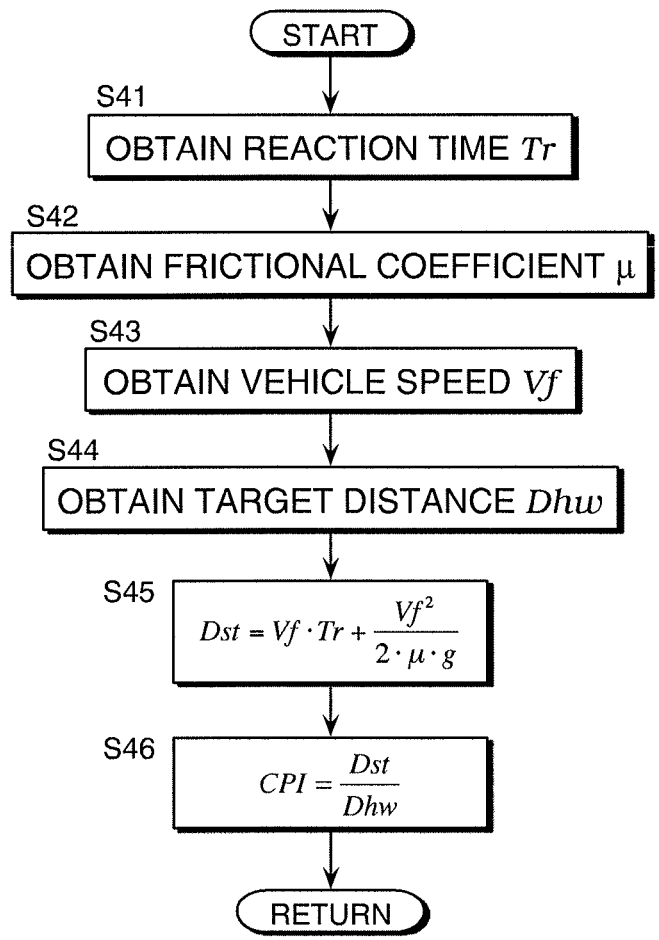
FIG. 3 is a flowchart illustrating a sub-routine executed by the controller to calculate a collision possibility index CPI.

In a step S12, the controller 11 calculates the collision possibility index CPI by executing a sub-routine shown in FIG. 3 on the basis of the obtained data.

Referring to FIG. 3, the controller 11 obtains the reaction time Tr of the driver in a step S41. As noted above, a fixed value stored in the ROM is used as the reaction time Tr, but an actual measurement value determined by a following method, for example, may also be used favorably.

A sensor that detects illumination of a stop lamp of a leading vehicle serving as the target and a sensor that detects depression of the brake pedal of the host vehicle are provided in the sensor group 15, a remaining time to depression of the brake pedal following illumination of the stop lamp of the leading vehicle is measured, and a resulting measured value is set as the reaction time Tr.

In a step S42, the controller 11 obtains the frictional coefficient μ between the tires and the road surface. As noted above, a fixed value stored in the ROM is used as the frictional coefficient μ, but the road surface frictional coefficient μ may also be set favorably on the basis of actual measurement. As a method for achieving this, for example, the road surface in the vehicle advancement direction may be illuminated by a laser beam at a predetermined angle, whereby irregularities on the road surface are detected from the strength of a reflected wave of the laser beam and the road surface frictional coefficient is estimated on the basis of the irregularities on the road surface.

In a step S43, the controller 11 obtains the vehicle speed Vf from the detected data of the sensor group 15.

In a step S44, the controller 11 obtains the target distance Dhw to the target, detected by the distance measurement sensor 18 of the sensor group 15.

An execution sequence of the steps S41 to S44 described above may be modified as desired.

In a step S45, the controller 11 calculates the stopping distance Dst of the vehicle using Equation (2). Here, the gravitational acceleration g is a fixed value stored in the ROM.

In a step S46, the controller 11 calculates the collision possibility index CPI from Equation (1) using the inter-vehicle distance Dhw and the stopping distance Dst calculated in the step S45. The sub-routine for calculating the collision possibility index CPI, described above, corresponds to a function of the CPI calculation unit 21.

Following the processing of the step S46, the controller 11 performs processing of a step S13 in the safe driving promotion control routine shown in FIG. 2.

Returning to FIG. 2, in the step S13, the controller 11 determines whether or not the collision possibility index CPI equals or exceeds 1. When the determination result is affirmative, the controller 11 performs processing of a step S14, and when the determination result is negative, the controller 11 repeats the processing of the steps S11 to S13 until the determination of the step S13 becomes affirmative.

In the step S14, the controller 11 measures the duration CPIt of the condition in which the CPI equals or exceeds 1 by counting up a dedicated timer.

Figure 4:
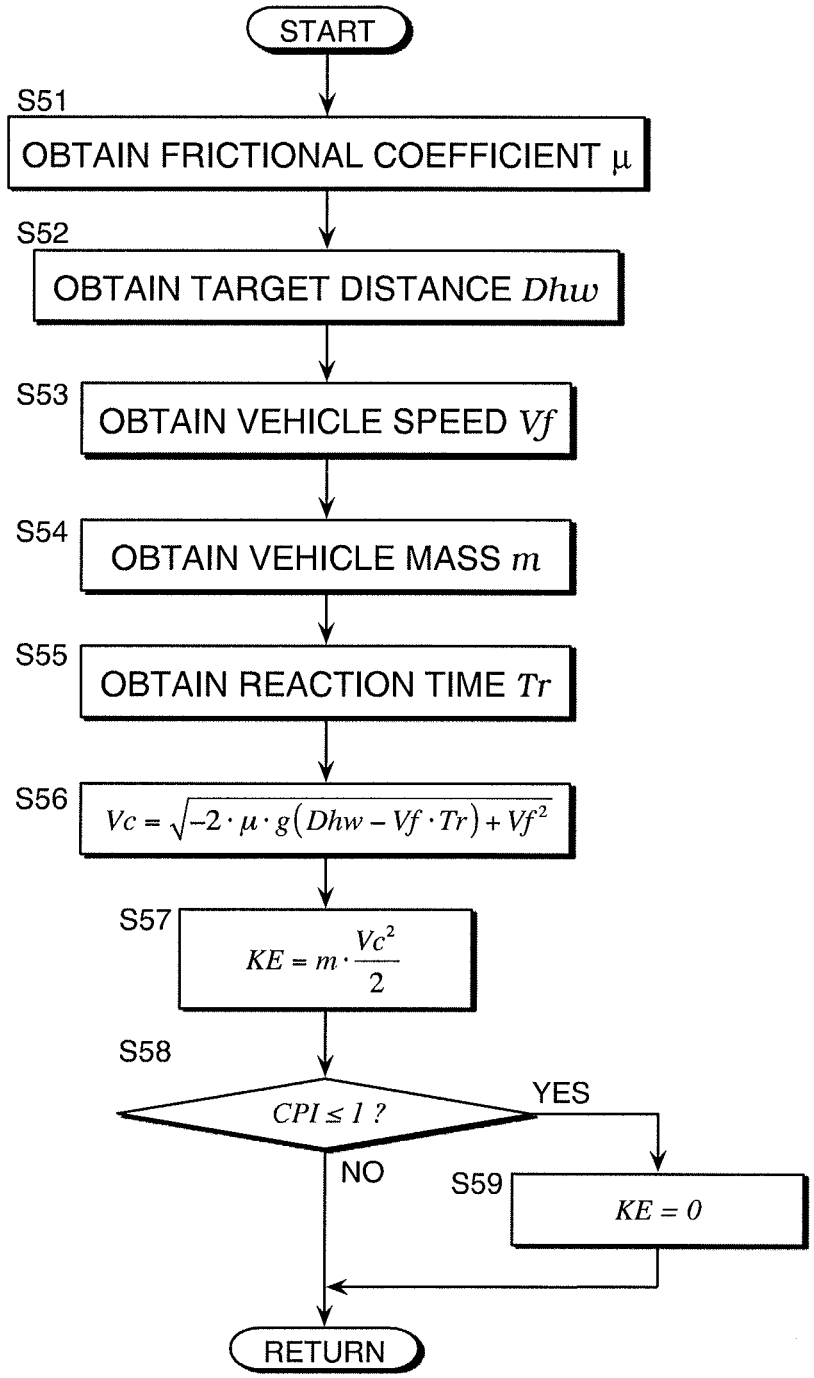
FIG. 4 is a flowchart illustrating a sub-routine executed by the controller to calculate a kinetic energy KE immediately before a collision.

In a step S15, the controller 11 calculates the kinetic energy value KE of the vehicle immediately before the collision by executing a sub-routine shown in FIG. 4.

Referring to FIG. 4, in a step S51, the controller 11 obtains the frictional coefficient μ between the tires and the road surface in a similar manner to the step S42.

In a step S52, the controller 11 obtains the inter-vehicle distance Dhw to the target in a similar manner to the step S44.

In a step S53, the controller 11 obtains the vehicle speed Vf from the detected data of the sensor group 15 in a similar manner to the step S43.

In a step S54, the controller 11 obtains the vehicle mass m from an output value of the mass sensor 20.

In a step S55, the controller 11 obtains the reaction time Tr of the driver in a similar manner to the step S41.

In a step S56, the controller 11 calculates the vehicle speed Vc immediately before the collision using Equation (3).

In a step S57, the controller 11 measures the kinetic energy value KE of the vehicle immediately before the collision using Equation (4).

In a step S58, the controller 11 determines whether or not the collision possibility index CPI calculated in the step S12 is equal to or smaller than 1. When the determination is affirmative, the controller 11 overwrites the kinetic energy value KE of the vehicle immediately before the collision to zero in a step S59, and then terminates the sub-routine.

When the determination is negative, on the other hand, the controller 11 terminates the sub-routine while maintaining the kinetic energy value KE of the vehicle immediately before the collision. The sub-routine for calculating the kinetic energy value KE of the vehicle immediately before the collision, described above, corresponds to a function of the kinetic energy calculation unit 22.

Returning to FIG. 2, after calculating the kinetic energy KE of the vehicle immediately before the collision in the step S15, the controller 11 determines in a step S16 whether or not the duration CPIt of the condition in which CPI equals or exceeds 1.0 is equal to or greater than a reference value CPItE. Here, the reference value CPItE is a fixed value stored in the ROM in advance.

When the determination of the step S16 is affirmative, this means that the condition in which the collision possibility index CPI is high has continued for a long time. In this case, the controller 11 determines that the driver is very tired and his/her concentration is decreasing rapidly, and therefore displays a warning encouraging the driver to stop the vehicle and rest on the monitor 12 in a step S17. The warning is also output by voice. Following the processing of the step S17, the controller 11 performs processing of a step S18.

When the determination of the step S16 is negative, on the other hand, the controller 11 skips the processing of the step S17 and performs the processing of the step S18 directly.

In the step S18, the controller 11 determines whether or not the collision possibility index CPI equals or exceeds a reference value CPIcE. Here, the reference value CPIcE is a fixed value stored in the ROM in advance.

When the determination of the step S18 is affirmative, the controller 11 determines that the possibility of a collision is extremely high, and therefore displays a warning encouraging the driver to increase the inter-vehicle distance on the monitor 12 in a step S19 together with information indicating the kinetic energy KE of the vehicle immediately before the collision, which shows a scale of the damage to be caused by the collision. The warning is also output by voice.

Following the processing of the step S19, the controller 11 performs the processing of the step S11 onward again. The processing of the steps S18 and S19 corresponds to a function of the warning unit 23.

When the determination of the step S18 is negative, the controller 11 performs the processing of the step S11 onward again without issuing the warning.

The controller 11 executes the processes described above repeatedly until the ignition switch is turned OFF.

By executing the safe driving promotion control routine and sub-routines described above, a warning can be issued in relation to the danger of a collision with a target in front of the vehicle in the vehicle advancement direction on the basis of the collision possibility index CPI, and moreover, the driver can be informed of the damage that will occur during the collision using the kinetic energy value KE of the vehicle immediately before the collision.

By providing this information, the importance of safe driving can be impressed on the driver forcefully. Further, by informing the driver of the extent of the damage to be caused by the collision, a sense of danger can be awakened in the driver such that the driver refrains from dangerous driving behavior voluntarily.

Furthermore, the warning is issued on the basis of not only the value of the collision possibility index CPI but also the duration CPIt of the condition in which CPI equals or exceeds 1, and therefore the driver can be encouraged to stop the vehicle and rest after determining a driving load, or in other words the driving tiredness and driving concentration, of the driver. Hence, a favorable effect is also obtained in terms of preventing a phenomenon whereby accidents are brought about by driver stress due to continuous driving in a condition where the danger of a collision is high.

Figure 5:
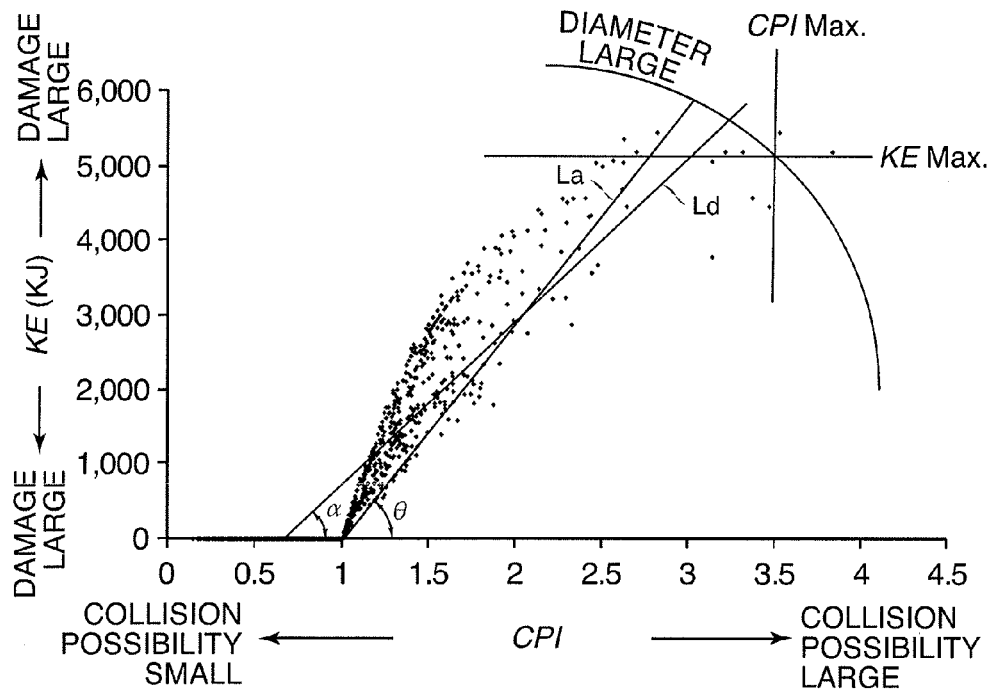
FIG. 5 is a diagram showing a characteristic of a risk evaluation map displayed on an information display by the controller.

Further, by having the controller 11 store the collision possibility index CPI calculated in the step S12 and the kinetic energy KE of the vehicle immediately before the collision calculated in the step S15 in the external storage device 14, the controller 11 can create a risk evaluation map such as that shown in FIG. 5 from the stored data.

Referring to FIG. 5, a driving history of the driver, which is stored in the external storage device 14, is illustrated by a large number of points plotted on the figure. An abscissa of the figure represents the collision possibility index CPI and an ordinate represents the kinetic energy KE of the vehicle immediately before the collision.

Further, of two straight lines drawn on the figure, a straight line Ld having a gentle incline represents a set of the points on the figure by a straight line drawn using geometrical means such as a method of least squares.

A straight line La having a sharp incline represents an incline of the set of points on the figure by a straight line having CPI=1.0 as an origin. CPI=1.0 means that the stopping distance and the inter-vehicle distance are equal. An incline θ of the straight line La indicates an increase rate of the damage to be caused by the collision. When the increase rate is large, the damage to be caused by the collision increases rapidly relative to an increase in the collision possibility index CPI, even if the collision possibility index CPI is not so large.

When a plurality of points are positioned on an identical horizontal line in the figure, this indicates great variation in the collision possibility index CPI relative to a constant kinetic energy KE of the vehicle immediately before the collision. This type of point distribution appears when the inter-vehicle distance to a vehicle traveling ahead varies greatly at a constant vehicle speed.

When a plurality of points are positioned on an identical vertical line in the figure, meanwhile, this indicates great variation in the kinetic energy KE immediately before the collision at an identical collision possibility index CPI. This type of point distribution appears when the vehicle travels while maintaining a constant inter-vehicle distance to the vehicle traveling ahead, regardless of the vehicle speed.

Crossed lines in the figure represent approximate maximum values of the collision possibility index CPI and the kinetic energy KE of the vehicle immediately before the collision. Further, an arc in the figure passes through an intersection between the crossed lines in the figure, centering on a point where CPI is 1.0 and KE is zero. An increase in a diameter of the arc indicates an increase in one or both the collision possibility index CPI and the kinetic energy KE of the vehicle immediately before the collision.

When driving is terminated, the controller 11 preferably displays the risk evaluation map on the monitor 12 in response to an operation performed by the driver on the operating panel 13. In so doing, the driver can analyze his/her driving operation by viewing the risk evaluation map displayed on the monitor 12.

Figure 6:
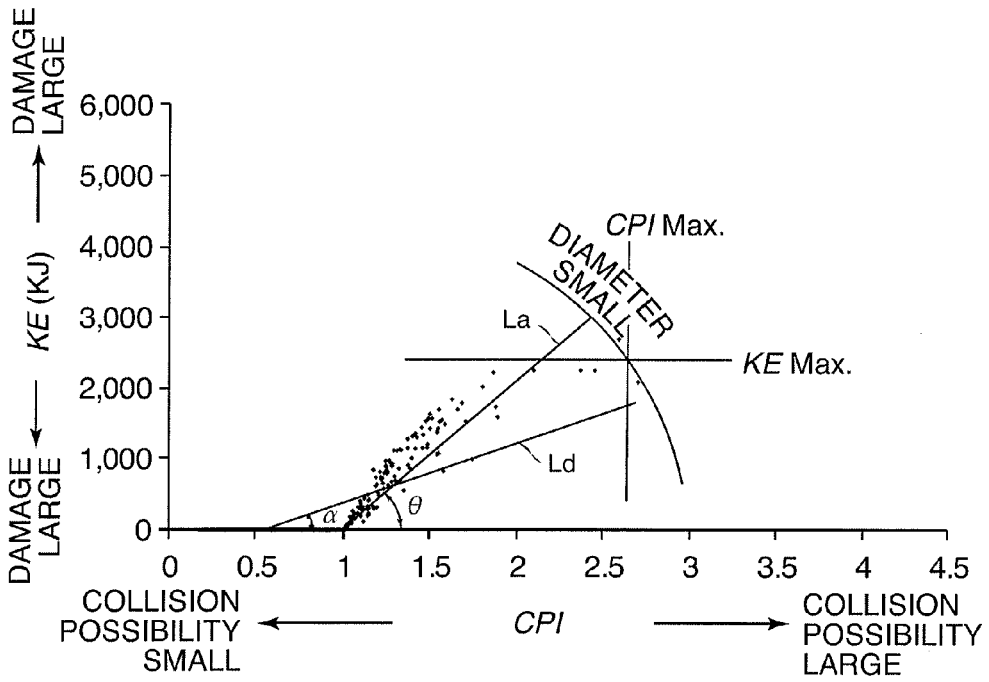
FIG. 6 is a diagram showing a characteristic of another risk evaluation map displayed on the information display by the controller.

On a risk evaluation map shown in FIG. 6, on the other hand, an intersection angle α between the straight line Ld and an X axis is smaller than that of the risk evaluation map shown in FIG. 5, and the diameter of the arc serving as an umbrella for the plotted points drawn using CPI=1.0 as an origin is also comparatively small. The kinetic energy value KE immediately before the collision corresponding to the maximum value of the collision possibility index CPI over the driving history is also small.

It cannot be said that a driver having this driving history is less likely to collide with a vehicle traveling ahead than a driver having the driving history shown on the risk evaluation map in FIG. 5. However, a collision energy generated during a collision can be suppressed.

The set of points shown on the driving history of FIG. 6 is shaped so as to curve in the horizontal direction at a CPI of approximately 1.9 while the kinetic energy value KE immediately before the collision remains small. It can therefore be seen that this driver has driven so as to vary the inter-vehicle distance while maintaining the vehicle speed. By creating a risk evaluation map plotting the driving history in this manner, the driver can recognize tendencies in his/her driving behavior.

Hence, the dangerousness of the driving behavior can be evaluated from the length and incline of the straight line La or the straight line Ld on the risk evaluation map.

Here, assuming from the risk evaluation map of FIG. 5 and the risk evaluation map of FIG. 6 that the driving conditions of the vehicle, apart from the driver, are identical, the length of the straight line Ld is shorter and the incline of the straight line Ld is smaller on the risk evaluation map of FIG. 6 than on the risk evaluation map of FIG. 5. It may be considered from this fact that the driving behavior of the driver represented on the risk evaluation map of FIG. 6 is less dangerous than the driving behavior of the driver represented on the risk evaluation map of FIG. 5. In other words, the driving of the driver represented on the risk evaluation map of FIG. 5 may be considered more dangerous than the driving of the driver represented on the risk evaluation map of FIG. 6.

By displaying this information on the monitor 12 when driving of the vehicle is terminated, the driver can objectively grasp the dangerousness of his/her driving operation. By comparing the risk evaluation map of FIG. 5 with the risk evaluation map of FIG. 6, it can be seen that the overall dangerousness of the driving, taking into consideration even the damage that would be caused by a collision, is higher in the former than in the latter. By providing the driver with this information, an appeal to the driver for safe driving can be made even more forcefully.

It should be noted that by storing the vehicle position information detected by the GPS 17 in the external storage device 14 together with the values of the collision possibility index CPI and the kinetic energy value KE immediately before the collision and creating individual risk evaluation maps in relation to traveling conditions such as an urban area, a suburban area, and an expressway, for example, the driver can be provided with even more detailed information for promoting safe driving.

Next, referring to FIG. 7 and FIG. 8, a second embodiment of this invention will be described.

In the safe driving promotion system for a road surface traveling vehicle according to the first embodiment, all components are installed in the vehicle. However, a safe driving promotion system for a road surface traveling vehicle according to this embodiment, aims for even greater promotion of safe driving through linkage to a base station on the exterior of the vehicle.

Figure 7:
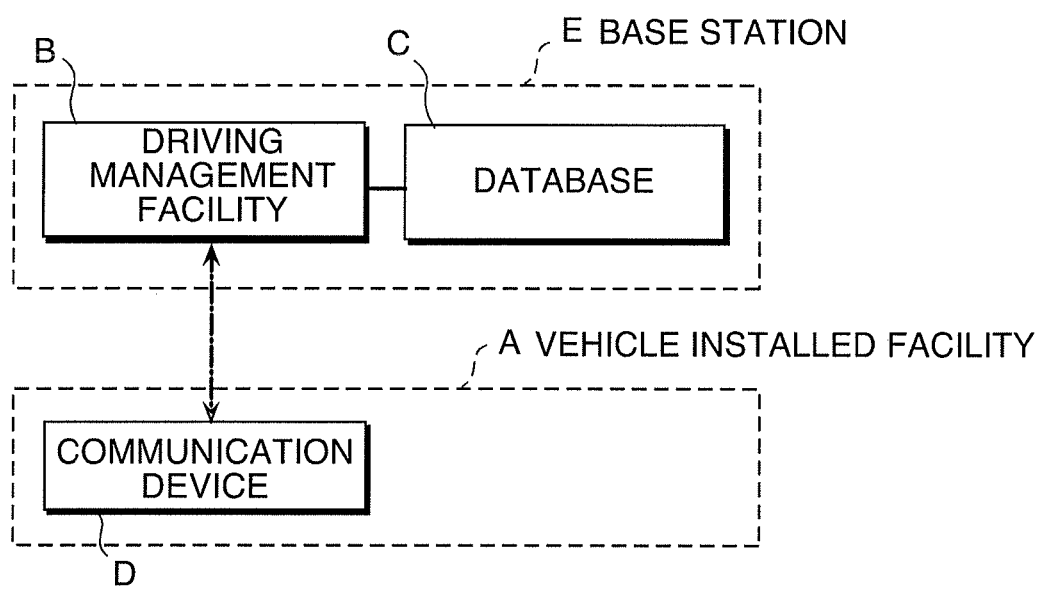
FIG. 7 is a block diagram showing a safe driving promotion system according to a second embodiment of this invention.

Referring to FIG. 7, for this purpose, a safe driving promotion system according to this embodiment is constituted by a vehicle installed facility A installed in the vehicle, and a driving management facility B and a database C disposed in a base station E on the exterior of the vehicle. The vehicle installed facility A comprises a communication device D in addition to the configurations of the first embodiment shown in FIG. 1.

The driving management facility B performs driving management on a plurality of vehicles installed with the vehicle installed facility A by communicating with the vehicles. The database C accumulates driving data relating to the individual vehicles, and when necessary communicates with the vehicle installed facilities A of the individual vehicles via the driving management facility B in order to store new data and supply stored data.

A communication method employed by the communication device D to perform communication between the vehicle installed facility A and the driving management facility B may be any communication method enabling mutual recognition and communication as required between the vehicle installed facility A and the driving management facility B.

When a predetermined transmission condition is established, the vehicle installed facilities A of the individual vehicles transmit driving data including the collision possibility index CPI and the kinetic energy KE of the vehicle immediately before the collision, which are stored in the external storage device 14, to the driving management facility B via the communication device D.

The database C stores these data using a predetermined management system. The database C also outputs accumulated data in response to an information provision request from the vehicle installed facility A or the driving management facility B. For example, when the driving management facility B requests provision of a risk evaluation map of a certain travel zone for a certain driver and a standard risk evaluation map for comparison, the database C outputs these maps to the driving management facility B.

The driving management facility B analyzes problems relating to driving management of the corresponding driver on the basis of the information input from the vehicle installed facility A by communication, stores analysis results in the database C, and transmits instructions based on the analysis results to the vehicle installed facility A of the information transmission source. For this purpose, the driving management facility B is likewise constituted by a microcomputer including a central processing unit (CPU), a read-only memory (ROM), a random access memory (RAM), and an input/output interface (I/O interface). The driving management facility B may be constituted by a plurality of microcomputers.

The database C is constructed in an external storage device such as a hard disk that is connected to the driving management facility B via the I/O interface.

Figure 8A:
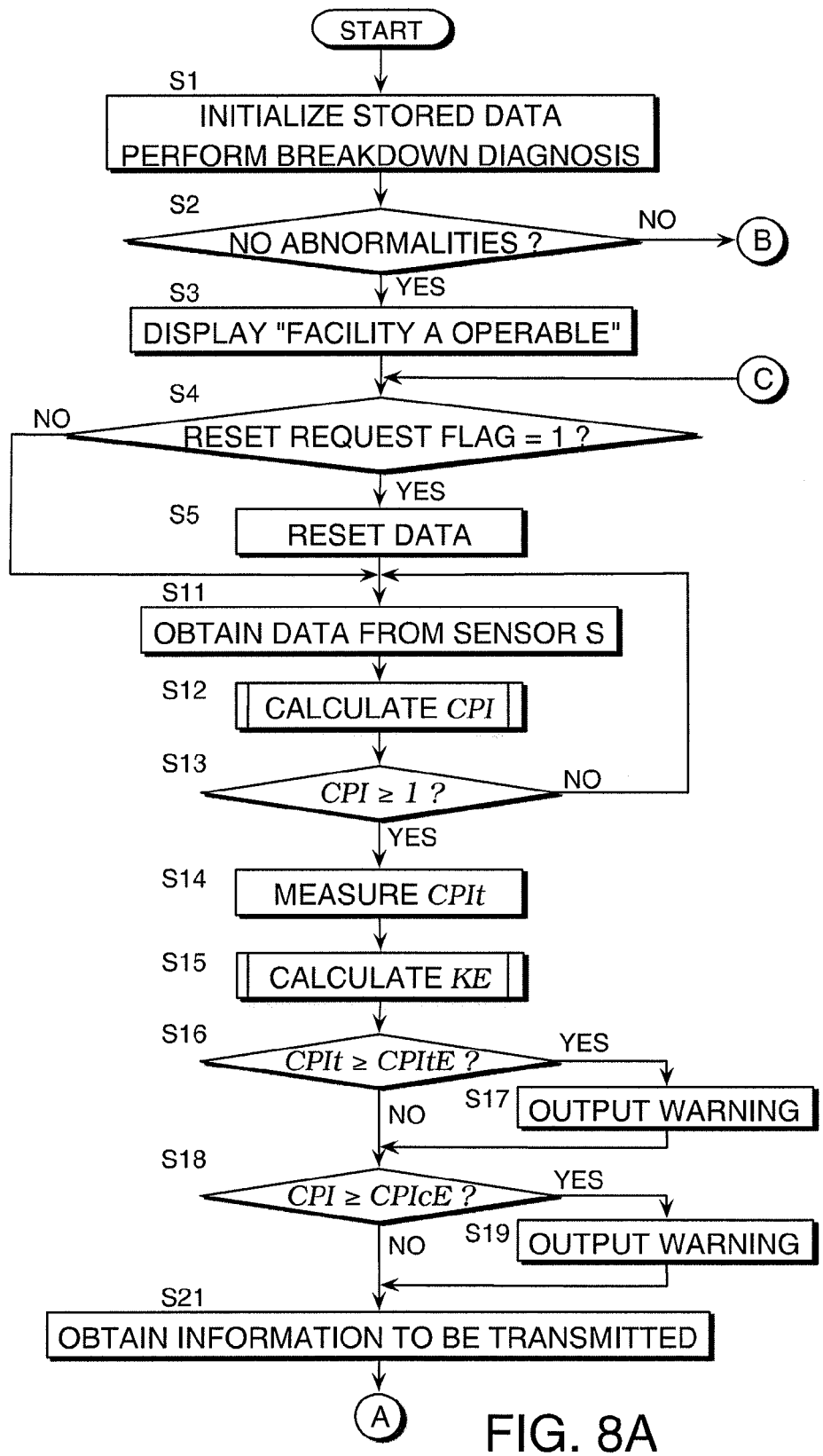
FIGS. 8A and 8B are a flowchart illustrating a safe driving promotion routine executed by the controller according to the second embodiment of this invention.
Figure 8B:
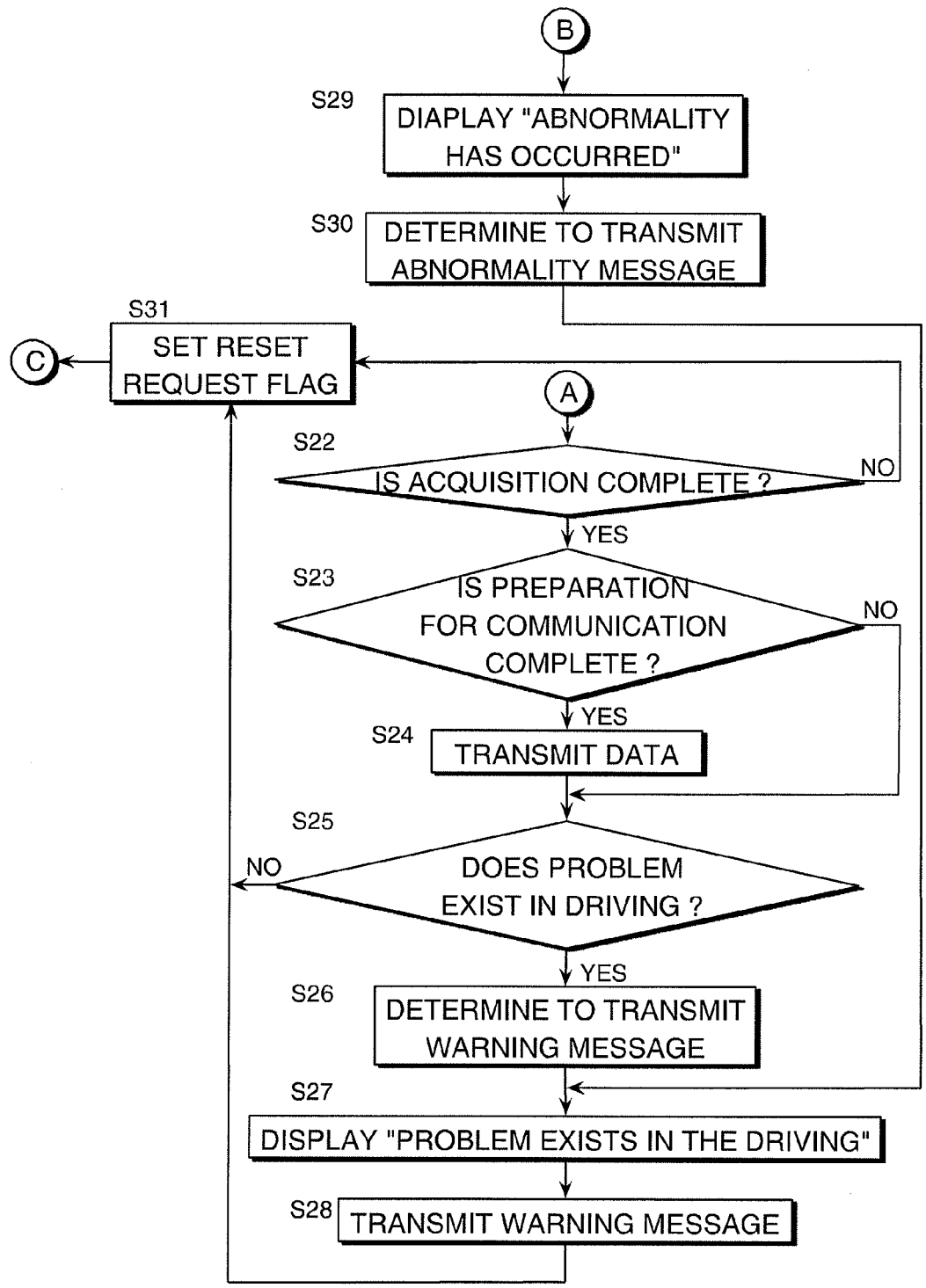

In the safe driving promotion system configured as described above, the controller 11 of the vehicle installed facility A executes a safe driving promotion control routine shown in FIGS. 8A and 8B instead of the safe driving promotion control routine shown in FIG. 2. This safe driving promotion control routine is likewise executed repeatedly in a condition where the ignition switch of the vehicle is ON and stopped when the ignition switch is turned OFF.

Referring to FIGS. 8A and 8B, in a step S1 executed immediately after the ignition switch is turned ON, the controller 11 initializes a part of the data stored in the external storage device 14 of the vehicle, including the duration CPIt. The controller 11 also performs a breakdown diagnosis on the respective devices constituting the sensor group 15.

In a step S2, the controller 11 determines whether or not the processing of the step S1 has been performed correctly and no abnormalities have been diagnosed in the devices. When the determination of the step S2 is negative, or in other words when an error occurs during the processing of the step S1 or an abnormality is diagnosed in one of the devices, the controller 11 performs processing of a step S29 onward.

When the determination of the step S2 is affirmative, the controller 11 displays a message on the monitor 12 indicating that the vehicle installed facility A can be operated in a step S3.

In a step S4, the controller 11 determines whether or not a reset request flag relating to data received via the communication device D has been set. An initial value of the reset request flag is zero.

When the determination of the step S4 is affirmative, the controller 11 resets data received from the driving management facility B in a step S5, and then performs processing of a step S11.

When the determination of the step S4 is negative, the controller 11 skips the processing of the step S5 and performs the processing of the step S11.

Processing from the step S11 to a step S19 is identical to that of the safe driving promotion control routine according to the first embodiment, shown in FIG. 2. It should be noted, however, that in the safe driving promotion system including the communication device D, the reference value CPItE of the duration CPIt used in the step S16 may be set upon each execution of the routine rather than taking a fixed value. More specifically, when the current position detected by the GPS 17 is input into the driving management facility B via the communication device D, the driving management facility B may search the database C to determine the traveling conditions and input a reference value CPItE corresponding to the traveling conditions into the controller 11 via the communication device D.

In this embodiment, when the determination of the step S18 is negative or following the processing of the step S19, the controller 11 performs processing of a step S21.

In the step S21, the controller 11 obtains information to be transmitted to the vehicle driving management facility B. The information includes the current position of the vehicle, detected by the GPS unit 17, the vehicle speed, the vehicle acceleration, the collision possibility index CPI, the duration CPIt, the kinetic energy KE of the vehicle immediately before the collision, the maximum value of the collision possibility index CPI, and the road surface frictional coefficient $\mu$.

In a step S22, the controller 11 determines whether or not acquisition of the information to be transmitted to the database C is complete.

When the determination of the step S22 is affirmative, the controller 11 performs processing of a step S23. When the determination of the step S22 is negative, the controller 11 sets the reset request flag in a step S31 and then repeats the processing of the step S4 onward.

In the step S23, the controller 11 determines whether or not preparation for communication between the controller 11 and the driving management facility B by the communication device D is complete.

When the determination of the step S22 is affirmative, the controller 11 transmits the data acquired in the step S21 to the driving management facility B via the communication device D in a step S24. The driving management facility B stores the received data in the database C. Following the processing of the step S24, the controller 11 performs processing of a step S25.

When the determination of the step S23 is negative, on the other hand, the controller 11 skips the processing of the step S24 and performs the processing of the step S25.

In the step S25, the controller 11 determines whether or not a problem exists in the driving of the driver. More specifically, when either the step S17 or the step S19 is executed, the determination of the step S25 is affirmative, and in all other cases, the determination of the step S25 is negative.

When the determination of the step S25 is affirmative, the controller 11 determines to transmit a warning message to the driving management facility B in a step S26.

In a step S27, the controller 11 displays a message indicating that a problem exists in the driving management of the vehicle on the monitor 12. The message is displayed continuously throughout the processing of the step S27 onward.

In a step S28, the controller 11 transmits the warning message to the driving management facility B.

Following the processing of the step S28, or when the determination of the step S25 is negative, the controller 11 sets the reset request flag in the step S31 and then repeats the processing of the step S4 onward.

When the determination of the step S2 is negative, on the other hand, or in other words when an error occurs during the processing of the step S1 or an abnormality is diagnosed in one of the devices, the controller 11 performs the processing of the step S29 onward.

In the step S29, the controller 11 displays a message indicating that an abnormality has occurred and a code indicating a location of the abnormality on the monitor 12.

In a step S30, the controller 11 determines to transmit an abnormality message to the driving management facility B.

Following the processing of the step S30, the controller 11 continues to display the message indicating that an abnormality has occurred and the code indicating the location of the abnormality on the monitor 12 in the step S27.

In step S28, the controller 11 transmits a message indicating that a problem has occurred in the vehicle installed facility A to the driving management facility B. Thereafter, the reset request flag is set in the step S31, after which the processing of the step S4 onward is repeated.

This safe driving promotion system differs from the standalone safe driving promotion system according to the first embodiment in that communication is performed between the vehicle installed facility A and the driving management facility B and database C of the base station as required. Therefore, the driving management facility B can grasp the driving performance of the drivers of a plurality of vehicles on the basis of messages from the vehicle installed facilities A of the respective vehicles and make use of this information during driving management of the vehicles.

The contents of Tokugan 2010-55508, with a filing date of Mar. 12, 2010 in Japan, are hereby incorporated by reference.

Although the invention has been described above with reference to certain embodiments, the invention is not limited to the embodiments described above. Modifications and variations of the embodiments described above will occur to those skilled in the art, within the scope of the claims.

For example, in the second embodiment, the risk evaluation map may be created by the driving management facility B of the base station upon reception of the collision possibility index CPI and the kinetic energy KE of the vehicle immediately before the collision, transmitted from the vehicle installed facility A, instead of by the vehicle installed facilities A of the respective vehicles, whereupon the created risk evaluation map may be transmitted to the vehicle installed facility A of the corresponding vehicle.

In both of the above embodiments, a target collision remaining time TTC may be used instead of the collision possibility index CPI. The target collision remaining time TTC is a remaining time to a collision assuming that a relative speed between the vehicle and the target in front of the vehicle remains at a current value.

INDUSTRIAL APPLICABILITY

The safe driving promotion system according to this invention is suitable for a road surface vehicle, but may also be applied to a vehicle that travels on a track, such as a train.

The embodiments of this invention in which an exclusive property or privilege is claimed are defined as follows:

The invention claimed is:

1. A vehicle safe driving promotion system, comprising:
a distance sensor that detects a target distance from a vehicle to a target in front of the vehicle;
a vehicle speed sensor that detects a vehicle speed; and
a programmable controller programmed to:
calculate a stopping distance of the vehicle from the vehicle speed;
calculate a collision possibility index corresponding to a ratio between the target distance and the stopping distance;
calculate a kinetic energy of the vehicle immediately before a collision with the target from the vehicle speed and the target distance, and a reaction time of a driver; and
provide the driver with information indicating a danger of a collision based on the collision possibility index and a collision damage based on the kinetic energy of the vehicle immediately before the collision.

2. The vehicle safe driving promotion system as defined in claim 1, wherein the controller is further programmed to:
measure a time in which the collision possibility index remains at or above a predetermined value; and
warn the driver of the vehicle of a possibility of a collision and a scale of damage to be caused by the collision when the time exceeds a predetermined time and the collision possibility index exceeds a predetermined value.

3. The vehicle safe driving promotion system as defined in claim 1, further comprising:
a storage device that stores the collision possibility index and the kinetic energy of the vehicle immediately before the collision as a traveling history of the vehicle; and
a monitor that displays a risk evaluation map based on the traveling history in the vehicle.

4. The vehicle safe driving promotion system as defined in claim 1, wherein the controller is further programmed to calculate the stopping distance of the vehicle using a following Equation (A):

$$\text{Dst} = Vf \cdot Tr + \frac{Vf^2}{2 \cdot \mu \cdot g} \tag{A}$$

where Dst is the stopping distance, Vf is the vehicle speed, Tr is the reaction time of the driver, $\mu$ is a frictional coefficient between a tire and a road surface, and g is a gravitational acceleration.

5. The vehicle safe driving promotion system as defined in claim 1, wherein the controller is further programmed to calculate the kinetic energy of the vehicle immediately before the collision using following Equations (B) and (C):

$$Vc = \sqrt{-2 \cdot \mu \cdot g(Dhw - Vf \cdot Tr) + Vf^2} \tag{B}$$

where Vc is the vehicle speed immediately before the collision, Dhw is the target distance, Tr is the reaction time of the driver of the vehicle, Vf is the vehicle speed, and $\mu$ is a frictional coefficient between a tire and a road surface;

$$KE = m \cdot \frac{Vc^2}{2} \tag{C}$$

where KE is the kinetic energy of the vehicle immediately before the collision, m is a vehicle mass, and Vc is the vehicle speed immediately before the collision.

6. The vehicle safe driving promotion system as defined in claim 1, further comprising:
a driving management facility provided in a base station on an exterior of the vehicle; and
a communication device installed in the vehicle to transmit and receive information between the driving management facility and the controller,
wherein the driving management facility comprises an external storage device that stores driving histories of a plurality of vehicles, and
the controller is further programmed to transmit vehicle travel information based on the collision possibility index and the kinetic energy of the vehicle immediately before the collision to the driving management facility.

7. A vehicle safe driving promotion system, comprising:
a distance sensor that detects a target distance from a vehicle to a target in front of the vehicle;
a vehicle speed sensor that detects a vehicle speed; and
a programmable controller programmed to:
calculate a stopping distance of the vehicle from the vehicle speed;

calculate a collision possibility index corresponding to a ratio between the target distance and the stopping distance;

calculate a kinetic energy of the vehicle immediately before a collision with the target from the vehicle speed and the target distance; and provide a driver with information indicating a danger of a collision based on the collision possibility index and a collision damage based on the kinetic energy of the vehicle immediately before the collision, wherein the controller is further programmed to calculate the stopping distance of the vehicle using a following Equation (A):

$$Dst = Vf \cdot Tr + \frac{Vf^2}{2 \cdot \mu \cdot g} \quad (A)$$

where Dst is the stopping distance, Vf is the vehicle speed, Tr is a reaction time of the driver, $\mu$ is a frictional coefficient between a tire and a road surface, and g is a gravitational acceleration.

8. A vehicle safe driving promotion system, comprising:
a distance sensor that detects a target distance from a vehicle to a target in front of the vehicle;
a vehicle speed sensor that detects a vehicle speed; and
a programmable controller programmed to:
calculate a stopping distance of the vehicle from the vehicle speed;
calculate a collision possibility index corresponding to a ratio between the target distance and the stopping distance;
calculate a kinetic energy of the vehicle immediately before a collision with the target from the vehicle speed and the target distance; and
provide a driver with information indicating a danger of a collision based on the collision possibility index and a collision damage based on the kinetic energy of the vehicle immediately before the collision, wherein the controller is further programmed to calculate the kinetic energy of the vehicle immediately before the collision using following Equations (B) and (C):

$$Vc = \sqrt{-2 \cdot \mu \cdot g(Dhw - Vf \cdot Tr) + Vf^2} \quad (B)$$

where Vc is the vehicle speed immediately before the collision, Dhw is the target distance, Tr is a reaction time of the driver of the vehicle, Vf is the vehicle speed, and $\mu$ is a frictional coefficient between a tire and a road surface;

$$KE = m \cdot \frac{Vc^2}{2} \quad (C)$$

where KE is the kinetic energy of the vehicle immediately before the collision, m is a vehicle mass, and Vc is the vehicle speed immediately before the collision.

* * * * *